United States Patent [19]

Yanagisawa et al.

[11] Patent Number: 5,521,017
[45] Date of Patent: May 28, 1996

[54] MAGNETIC RECORDING MEDIUM

[75] Inventors: Masahiro Yanagisawa; Nobuaki Yoshioka, both of Tokyo, Japan

[73] Assignee: NEC Corporation, Tokyo, Japan

[21] Appl. No.: 247,483

[22] Filed: May 23, 1994

Related U.S. Application Data

[63] Continuation of Ser. No. 800,100, Nov. 29, 1991, abandoned.

[30] Foreign Application Priority Data

Nov. 30, 1990  [JP]  Japan .................................. 2-329680

[51] Int. Cl.$^6$ .................................................. G11B 5/72
[52] U.S. Cl. .................................. 428/626; 428/694 TF
[58] Field of Search ........................... 428/611, 694 TF, 428/694 BP, 900, 626, 629, 634, 928

[56] References Cited

U.S. PATENT DOCUMENTS

| | | | |
|---|---|---|---|
| 4,529,659 | 7/1985 | Hoshino et al. | 428/900 |
| 4,713,279 | 12/1987 | Fujiwara | 428/695 |
| 4,849,305 | 7/1989 | Yanagisawa | 428/695 |
| 4,889,767 | 12/1989 | Yokoyama et al. | 428/336 |
| 5,017,337 | 5/1991 | Nabae et al. | 420/532 |

FOREIGN PATENT DOCUMENTS

| | | | |
|---|---|---|---|
| 0432536 | 6/1991 | European Pat. Off. | 428/695 |
| 52-20804 | 2/1977 | Japan . | |
| 52-49805 | 4/1977 | Japan . | |
| 62-45562 | 2/1987 | Japan . | |
| 63-77996 | 4/1988 | Japan . | |
| 64-9961 | 1/1989 | Japan . | |
| 6408891 | 4/1989 | Japan | 428/695 |
| 0214192 | 5/1990 | Japan | 428/695 |
| 0400662 | 1/1992 | Japan | 428/695 |

OTHER PUBLICATIONS

Frictional Properties of Novel Lubricants for Magnetic Thin Film Media, IEEE Transactions on Magnetics, vol. 26, No. 5, Sep. 1990. Kondo et al.

*Primary Examiner*—David A. Simmons
*Assistant Examiner*—Linda L. Gray
*Attorney, Agent, or Firm*—Sughrue, Mion, Zinn, Macpeak & Seas

[57] ABSTRACT

A magnetic recording medium includes a magnetic layer coated on a support, and a lubricant coated on the magnetic layer and consisting of a compound represented by a formula:

$$H_{(3-x)}F_xC\text{-}C_nF_{2n}\text{-}G\text{-}C_mH_{(2m+1)}$$

(wherein x represents an integer of 0, 1, or 2, each of n and m independently represents an integer of 3 or more, and G represents a divalent functional group.)

19 Claims, 1 Drawing Sheet

MAGNETIC RECORDING MEDIUM

This is a Continuation of application Ser. No. 07/800,100 filed Nov. 29, 1991, now abandoned.

BACKGROUND OF THE INVENTION

The present invention relates to a magnetic recording medium for use in a magnetic recording apparatus, such as a magnetic disk drive or a magnetic drum device.

Generally, in a magnetic recording apparatus having a recording/reproduction head (to be referred to as a head hereinafter) and a magnetic recording medium as its components, a method of recording and reproduction is as follows. That is, at the start of an operation, the head is set in contact with the surface of the magnetic recording medium, and the magnetic recording medium is rotated at a predetermined speed. As a result, a space serving as an air layer is formed between the head and the surface of the magnetic recording medium. In this state, a recording or reproduction operation is performed (this method will be referred to as a contact-start-stop system, or CSS hereinafter). In this method, the rotation of the magnetic recording medium stops at the end of the operation, and at this time the head and the surface of the magnetic recording medium are set in the contact state with a friction as when the operation is started.

A frictional force produced between the head and the magnetic recording medium in this contact state with a friction abrades the head and the magnetic recording medium and eventually may form scratches on the head and the magnetic recording medium. In addition, in the contact state with a friction, a slight change in position of the head makes a load applied on the head unbalanced. This may produce scratches on the surface of the head and that of the magnetic recording medium. In this case, the head is any one of a laminated alloy substrate consisting of, e.g., an aluminum alloy, a titanium alloy, or stainless steel and coated with a metal, plastic, or ceramic; a plastic substrate coated with a metal or ceramic; or a ceramic substrate coated with a metal or plastic. Furthermore, the head and the magnetic recording medium stick to each other due to a long-time contact between them and it consequently becomes difficult to separate them from each other.

In order to prevent the destruction and sticking of the magnetic recording medium caused by the contact and sliding with the head, a lubricant, such as perfluoropolyether, is conventionally coated on the surface of the magnetic recording medium, as described in Japanese Patent Laid-Open No. 52-49805. In addition, Japanese Patent Laid-Open No. 64-9961, 63-77996, or 62-45562 discloses a lubricant containing alkylperfluoroalkaneamide, perfluoroalkylcarboxylic acid amine salt, or perfluorocarboxylic acid ester.

A lubricant such as perfluoropolyether, however, has a low load resistance and therefore cannot prevent production of scratches on the magnetic recording medium upon sliding with the head or upon repetition of CSS by a large number of times. In addition, there is another problem that a thick layer of the removed lubricant is locally formed between the contact sliding surfaces of the magnetic recording medium and the head, and this makes it impossible to separate the head and the magnetic recording medium from each other. The lubricant using alkylperfluoroalkaneamide, perfluoroalkylcarboxylic amine salt, or perfluorocarboxylic acid ester is poor in orientation of molecules and consequently does not have adhesive force enough to hold lubricant molecules on the surface of the magnetic recording medium. This lubricant also has a disadvantage that it is removed upon sliding with the head.

SUMMARY OF THE INVENTION

It is a principal object of the present invention to provide a magnetic recording medium which is small in friction coefficient caused by sliding with a head and therefore has a high abrasion resistance.

It is another object of the present invention to provide a magnetic recording medium which does not produce any sticking force even after a long-time static contact with a head.

It is still another object of the present invention to provide a magnetic recording medium in which a lubricant is not removed upon sliding with a head.

In order to achieve the above objects of the present invention, there is provided a magnetic recording medium comprising a magnetic layer coated on a support, and a lubricant coated on the magnetic layer and consisting of a compound represented by Formula [I]:

$$H_{(3-x)}F_xC\text{-}C_nF_{2n}\text{-}G\text{-}C_mH_{(2m+1)} \qquad [I]$$

(wherein x represents an integer of 0, 1, or 2, each of n and m independently represents an integer of 3 or more, and G represents a divalent functional group.)

The basic arrangement of the magnetic recording medium according to the present invention is, as shown in FIG. 1, such that a magnetic layer 2 is coated on a support 1, and a lubricant 4 consisting of a compound represented by Formula [I] is coated on the magnetic layer. Alternatively, the magnetic recording medium has a structure in which a protective film 3 is coated between the magnetic layer 2 and the lubricant 4, as shown in FIG. 2.

In the present invention,  is a fluorinated hydrocarbon group containing hydrogen in its one end, and $-C_mH_{(2m+1)}$ is a hydrocarbon group. G is a functional group such as $-OCONH-$, $-COO^-N^+H_3-$, $-CONHCONH-$, $-COO-$, $-OCO-$, $-CO-$, $-O-$, $-NH-$, $-Si(OH)_2-$, $-SiCH_3(OH)-$, $-C_qH_{2q}Si(OH)_2-$, or $-C_qH_{2q}SiCH_3(OH)-$ (note that q is 1, 2, or 3). These functional groups have a high adhesive or holding force onto the surface of the magnetic recording medium.

Examples of the support are a metal such as an aluminum alloy, a titanium alloy, or a stainless steel alloy; plastic such as polyester, polyimide, polyamideimide, polyethersulfone, polysulfone, aromatic polyether, an epoxy resin, a urea resin, a melamine resin, polycarbonate, a diallylphthalate resin, an acrylic resin, a phenolic resin, polyphenylenesulfide, polyphenyleneether, a polyacetal resin, polybutyreneterephthalate, a bismaleimidetriazine resin, a polyoxybenzylene resin, a polyaminobismaleimide resin, polyphenyleneoxide, or polyphenylenesulfide; ceramics such as glass, silicon, germanium, alumina, silica, or diamond; and a metal such as an aluminum alloy coated with anodized aluminum, an Ni—P—plating film, Cr, FeNi, stainless steel, Mo, or W.

Examples of the magnetic layer 2 coated on the support 1 are an oxide such as $Fe_3O_4$, $\gamma\text{-}Fe_2O_3$, barium ferrite, or $CrO_2$; a nitride such as $Fe_3N_4$; a carbide such as $Fe_5C_2$; a metal containing cobalt such as Co, CoNi, CoNiP, CoMnP, CoMnNiP, CoRe, CoPt, CoNiPt, CoCr, CoCrTa, CoNiRe, CoMnReP, CoFeCr, CoV, CoRu, CoOs, CoPtCr, CoPtV, CoRh, CoCrRh, CoNiMo, CoNiCr, CoNiW, or CoSm; a metal containing iron such as FeNd, FeMg, FeNd, FeAg, FePd, or FeTb; and a metal containing manganese such as MnAl MnCuAl. Alternatively, a resin in which fine particles of the above various magnetic materials are mixed and dispersed may be used.

Examples of the protective film 3 shown in FIG. 2 are a silicon compound such as $SiO_2$, $Si_3N_4$, SiC, or a silicic acid polymer; a metal oxide such as $Al_2O_3$, CoO, $Co_3O_4$, $Co_2O_3$, $\alpha\text{-}Fe_2O_3$, $Cr_2O_3$, $CrO_3$, $TiO_2$, $ZrO_2$, ZnO, PbO, NiO, $MoO_2$, or $SnO_2$; a metal nitride such as TiN, ZrN, CrN, TaN, or BN; a metal sulfide such as $MoS_2$, $WS_2$, or $TaS_2$; a metal carbide such as TiC, ZrC, CrC, or TaC; a metal fluoride such as graphite fluoride; a metal such as W, Cr, Ir, NiB, NiP, FeCr, NiCr, Sn, Pb, Zn, Tl, Au, Ag, Cu, Ga, Ru, Rh, Mn, Mo, Os, or Ta, or an alloy of each of these metals; a semiconductor such as Si, Ge, B, or C (e.g., amorphous carbon, diamond-like carbon or a mixture thereof, or graphitelike carbon or a mixture thereof); and plastic such as polytetrafluoroethylene, a phenolic resin, or polyimide.

As shown in FIG. 3, the lubricant consisting of a compound represented by Formula [I] is hardly removed upon sliding and has a high load resistance because a functional group 7 contained in its molecule adheres onto a surface 5 of the magnetic recording medium (i.e., the surface of the magnetic layer 2 or the protective film 3). In addition, fluorinated hydrocarbon 9, which contains hydrogen 10 in its one end, and hydrocarbon 8 are oriented in a direction toward the surface, resulting in a low friction coefficient and a high load resistance. In this case, the fluorinated hydrocarbon 9 and the hydrocarbon 8 have a low affinity and are consequently weak in cohesive force and poor in orientation performance. The hydrogen 10 contained in one end of the fluorinated hydrocarbon increases the affinity in the hydrocarbon 8 and in this manner realizes a strong cohesive force 11. Therefore, the orientation performance is improved, and this results in a high abrasion resistance. In this case, the fact that the hydrogen is contained in one end of the fluorinated hydrocarbon is important. That is, since molecules near the contact surface with the magnetic head attract each other by a cohesive force, a low friction coefficient and a high load resistance can be obtained. As a result, it is possible to obtain a high heat resistance and good characteristics such that sticking between the head and the magnetic recording medium hardly occurs due to a low surface tension.

DETAILED DESCRIPTION OF THE PREFERRED EMBODIMENTS

Figure 1:
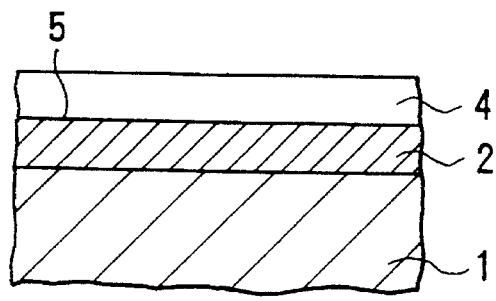
FIGS. 1 and 2 are sectional views respectively showing embodiments of a magnetic recording medium according to the present invention.
Figure 2:
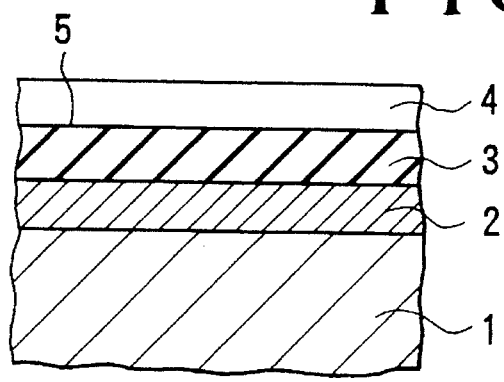
Figure 3:
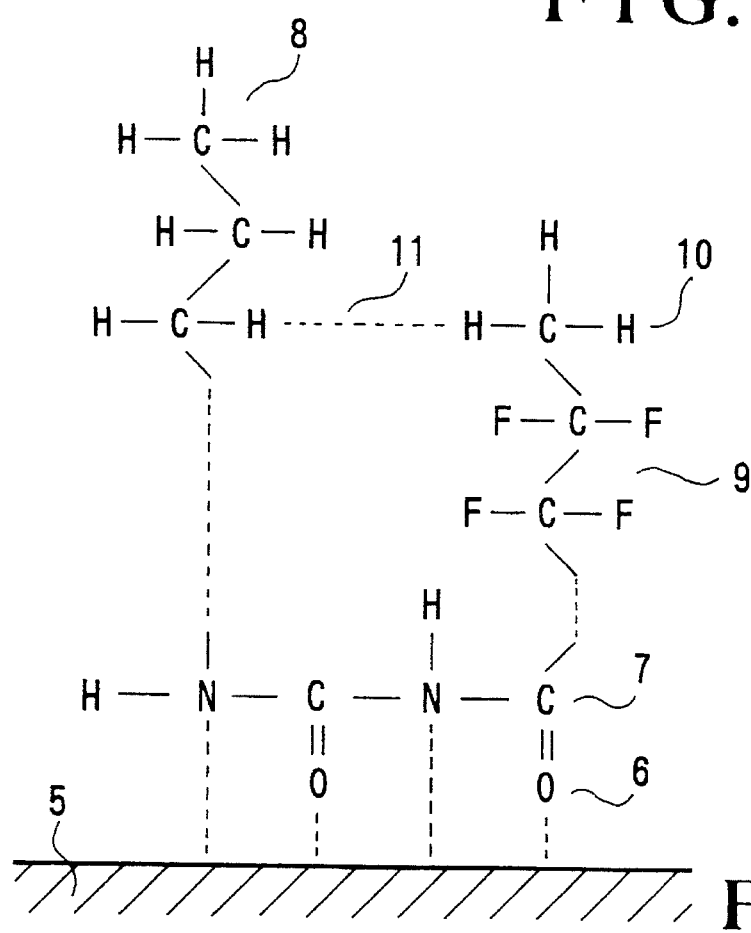
FIG. 3 is a schematic view for explaining the molecular structure of a lubricant according to the present invention on the surface of the magnetic recording medium.

The present invention will be described in more detail below by way of its examples.

EXAMPLE 1

A nickel-phosphorus plating film was coated on an aluminum alloy substrate and planished such that a surface roughness of 0.02 μm was obtained. A cobalt-nickel-phosphorus alloy as a magnetic layer was plated on the resulting support to have a thickness of 0.05 μm. Subsequently, polysilicic acid (a polysilicic acid polymer) as described in Japanese Patent Laid-Open No. 52-20804 was coated as a protective film on the magnetic layer to have a thickness of 50 nm by a spin coating method, and the resulting material was burned at 250° C. A solution of a compound having Structure (1) below was coated as a lubricant on the resulting protective film to have a thickness of 2 nm by the spin coating, thus manufacturing a magnetic disk.

$$HCF_2C_9F_{18}COO^-N^+H_3C_{17}H_{35} \qquad (1)$$

This magnetic disk was subjected to a CSS test of 100,000 times to evaluate its abrasion resistance. Consequently, no change was found in the initial friction coefficient of 0.1, and no scratches were found on the surface of a head and that of the magnetic disk. In addition, the head and the magnetic disk were left to stand for 70 hours, and the sticking force acting between them was measured. The result was that the sticking force remained unchanged at 1.0 time compared with the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 2

Following the same procedures as in Example 1 except that a carbon film coated by sputtering was used as a protective film, a lubricant similar to that in Example 1 was coated on the carbon film, thereby manufacturing a magnetic disk.

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 3

Following the same procedures as in Example 1 except that 10-nm thick nickel-phosphorus was coated on a magnetic layer by electroless plating, burned at 300° C., and oxidized to form a protective film consisting of NiO, a lubricant similar to that in Example 1 was coated on the resulting protective film, thereby manufacturing a magnetic disk.

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 4

Following the same procedures as in Example 1 except that 20-nm thick diamond-like carbon was coated as a protective film on a magnetic layer by chemical vapor deposition, a lubricant similar to that in Example 1 was coated on the protective film, thereby manufacturing a magnetic disk.

This magnetic disk was subjected to a CSS test of 100,000 times to evaluate its abrasion resistance. As a result, the initial friction coefficient remained unchanged at 0.15, and no scratches were found on the surface of a head and that of the magnetic disk. In addition, the head and the magnetic disk were left to stand for 70 hours, and the sticking force acting between them was measured. The result was that no increase was found in the sticking force compared with the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 5

Following the same procedures as in Example 1 except that a magnetic layer was composed of a $\gamma$-$Fe_2O_3$ thin film formed by sputtering, a lubricant similar to that in Example 1 was coated on the magnetic layer, thereby manufacturing a magnetic disk.

This magnetic disk was subjected to a CSS test of 100,000 times to evaluate its abrasion resistance. As a result, the initial friction coefficient remained unchanged at 0.1, and no scratches were found on the surface of a head and that of the magnetic disk. In addition, the head and the magnetic disk were left to stand for 70 hours, and the sticking force acting between them was measured. The result was that the sticking force increased to be at most 1.3 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 6

Following the same procedures as in Example 1 except that a 1-μm thick Cr film was coated on an NiP plating layer by sputtering, a 0.05-μm thick CoNi alloy was coated as a magnetic layer on the Cr film by the sputtering, and a 20-nm thick $SiO_2$ film was coated as a protective film on the magnetic layer by the sputtering, a lubricant similar to that in Example 1 was coated on the protective film, thereby manufacturing a magnetic disk.

This magnetic disk was subjected to a CSS test of 100,000 times to evaluate its abrasion resistance. As a result, the initial friction coefficient remained unchanged at 0.1, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 7

A magnetic disk was manufactured following the same procedures as in Example 1 except that a carbon film coated by sputtering was used as a protective film, and that a solution of a compound having Structure (2) below was coated as a lubricant on the protective film to have a thickness of 2 nm by spin coating.

$$H_3CC_{10}F_{20}COO^-N^+H_3C_{22}H_{45} \qquad (2)$$

This magnetic disk was subjected to a CSS test of 100,000 times to evaluate its abrasion resistance. As a result, the initial friction coefficient remained unchanged at 0.05, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 8

A magnetic disk was manufactured following the same procedures as in Example 1 except that a carbon film coated by sputtering was used as a protective film, and that a solution of a compound having Structure (3) below was coated as a lubricant on the protective film to have a thickness of 2 nm by spin coating.

$$H_2CC_{10}F_{20}OCONHC_{22}H_{45} \qquad (3)$$

This magnetic disk was subjected to a CSS test of 100,000 times to evaluate its abrasion resistance. As a result, the initial friction coefficient remained unchanged at 0.05, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 9

A magnetic disk was manufactured following the same procedures as in Example 1 except that a carbon film coated by sputtering was used as a protective film, and that a solution of a compound having Structure (4) below was coated as a lubricant on the protective film to have a thickness of 2 nm by spin coating.

$$H_2CFC_9F_{18}CONHCONHC_{22}H_{45} \quad (4)$$

This magnetic disk was subjected to a CSS test of 100,000 times to evaluate its abrasion resistance. As a result, the initial friction coefficient remained unchanged at 0.06, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 10

A magnetic disk was manufactured following the same procedures as in Example 1 except that a carbon film coated by sputtering was used as a protective film, and that a solution of a compound having Structure (5) below was coated as a lubricant on the protective film to have a thickness of 2 nm by spin coating.

$$H_2CFC_9F_{18}COOC_{18}H_{37} \quad (5)$$

This magnetic disk was subjected to a CSS test of 100,000 times to evaluate its abrasion resistance. As a result, the initial friction coefficient remained unchanged at 0.06, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 11

A magnetic disk was manufactured following the same procedures as in Example 1 except that a carbon film coated by sputtering was used as a protective film, and that a solution of a compound having Structure (6) below was coated as a lubricant on the protective film to have a thickness of 2 nm by spin coating.

$$HCF_2C_9F_{18}OCOC_{18}H_{37} \quad (6)$$

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 12

A magnetic disk was manufactured following the same procedures as in Example 1 except that a carbon film coated by sputtering was used as a protective film, and that a solution of a compound having Structure (7) below was coated as a lubricant on the protective film to have a thickness of 2 nm by spin coating.

$$HCF_2C_9F_{18}COC_{18}H_{37} \quad (7)$$

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 13

A magnetic disk was manufactured following the same procedures as in Example 1 except that a carbon film coated by sputtering was used as a protective film, and that a solution of a compound having Structure (8) below was coated as a lubricant on the protective film to have a thickness of 2 nm by spin coating.

$$HCF_2C_9F_{18}OC_{18}H_{37} \quad (8)$$

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 14

A magnetic disk was manufactured following the same procedures as in Example 1 except that a carbon film coated by sputtering was used as a protective film, and that a solution of a compound having Structure (9) below was coated as a lubricant on the protective film to have a thickness of 2 nm by spin coating.

$HCF_2C_9F_{18}NHC_{18}H_{37}$ (9)

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 15

A magnetic disk was manufactured following the same procedures as in Example 1 except that a carbon film coated by sputtering was used as a protective film, and that a solution of a compound having Structure (10) below was coated as a lubricant on the protective film to have a thickness of 2 nm by spin coating.

$HCF_2C_9F_{18}-C_2H_4Si(OH)_2C_{18}H_{37}$ (10)

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

EXAMPLE 16

A magnetic disk was manufactured following the same procedures as in Example 1 except that a carbon film coated by sputtering was used as a protective film, and that a solution of a compound having Structure (11) below was coated as a lubricant on the protective film to have a thickness of 2 nm by spin coating.

$HCF_2C_9F_{18}-C_2H_4SiCH_3(OH)C_{18}H_{37}$ (11)

This magnetic disk was subjected to a CSS test of 100,000 times to evaluate its abrasion resistance. As a result, the initial friction coefficient remained unchanged at 0.07, and no scratches were found on the surface of a head and that of the magnetic disk. In addition, the head and the magnetic disk were left to stand for 70 hours, and the sticking force acting between them was measured. The result was that the sticking force increased to be at most 1.2 times that in the case in which they were not left to stand. Furthermore, no change was found in friction coefficient even after the magnetic disk was left to stand at a temperature of 40° C. and a humidity of 80% for 20 days, and no scratches were found on the surface of the magnetic disk even after the CSS test of 100,000 times.

COMPARATIVE EXAMPLE 1

A magnetic disk was manufactured following the same procedures as in Example 7 except that perfluoropolyether having Structure (12) below was coated as a lubricant to have a thickness of 1 nm.

$F(C_2F_4O)_5(CF_2O)_{15}CF_3$ (12)

This magnetic disk was subjected to a CSS test of 20,000 times to evaluate its abrasion resistance. As a result, the friction coefficient increased to be seven times that before the test, and scratches reaching the magnetic layer were produced on the surface of a head and that of the magnetic disk. In addition, the head and the magnetic disk were left to stand for 70 hours, and the sticking force acting between them was measured. That result was that the sticking force increased to be ten times that in the case in which they were not left to stand.

COMPARATIVE EXAMPLE 2

A magnetic disk was manufactured following the same procedures as in Example 7 except that alkylperfluoroalkaneamide having Structure (13) below was coated as a lubricant to have a thickness of 1 nm.

$C_{18}H_{37}NHCOC_7F_{15}$ (13)

This magnetic disk was subjected to a CSS test of 20,000 times to evaluate its abrasion resistance. As a result, the friction coefficient increased to be four times that before the test, and scratches reaching the magnetic layer were produced on the surface of a head and that of the magnetic disk. In addition, when the magnetic disk was left to stand at a temperature of 40° C. and a humidity of 80% for 20 days, the friction coefficient increased to be five times that before the test. Also, scratches were found on the surface of the magnetic disk after a CSS test of 5,000 times.

COMPARATIVE EXAMPLE 3

A magnetic disk was manufactured following the same procedures as in Example 7 except that perfluoroalkylcarboxylic acid amine salt having Structure (14) below was coated as a lubricant to have a thickness of 1 nm.

$C_{18}H_{37}^+NH_3^-OOCC_7F_{15}$ (14)

This magnetic disk was subjected to a CSS test of 20,000 times to evaluate its abrasion resistance. As a result, the friction coefficient increased to be six times that before the test, and scratches reaching the magnetic layer were produced on the surface of a head and that of the magnetic disk. In addition, when the magnetic disk was left to stand at a temperature of 40° C. and a humidity of 80% for 20 days, the friction coefficient increased to be five times that before the test. Also, scratches were found on the surface of the magnetic disk after a CSS test of 5,000 times.

COMPARATIVE EXAMPLE 4

A magnetic disk was manufactured following the same procedures as in Example 7 except that perfluorocarboxylic acid ester having Structure (15) below was coated as a lubricant to have a thickness of 1 nm.

$$C_{18}H_{37}OOCC_7F_{15} \quad (15)$$

This magnetic disk was subjected to a CSS test of 20,000 times to evaluate its abrasion resistance. As a result, the friction coefficient increased to be four times that before the test, and scratches reaching the magnetic layer were produced on the surface of a head and that of the magnetic disk. In addition, when the magnetic disk was left to stand at a temperature of 40° C. and a humidity of 80% for 20 days, the friction coefficient increased to be five times that before the test. Also, scratches were found on the surface of the magnetic disk after a CSS test of 5,000 times.

As described above, the lubricant of the present invention in which fluorinated hydrocarbon, which contains hydrogen in its one end, and hydrocarbon are bonded by a functional group can provide good characteristics extremely different from those obtained by the lubricant of each comparative example in which fluorinated hydrocarbon, which does not contain hydrogen, and hydrocarbon are bonded by a functional group. This fact is surprising when only the difference between the chemical formulas of the two lubricants is taken into account. However, when actual stereoscopic molecular models of the two lubricants are taken into consideration, the difference between their molecular forms is extremely large. It is assumed that this difference heavily influences the orientation of all molecules and the sticking force with respect to a support, and that this is reflected on the difference between the characteristics.

As has been described in detail above, the magnetic recording medium of the present invention has a small friction coefficient with respect to sliding with a head and a high abrasion resistance. In addition, the magnetic recording medium does not produce any sticking force even after a long-time static contact with a magnetic head and is chemically stable under high-humidity conditions. As a result, the reliability of this magnetic recording medium can be by far improved as compared with those of conventional magnetic recording media.

What is claimed is:

1. A magnetic recording medium comprising:
a magnetic layer coated on a support; and
a lubricant coated on said magnetic layer and comprising a compound represented by a formula:

$$H_{(3-x)}F_xC-C_nF_{2n}-G-C_mH_{(2m+1)}$$

wherein x represents an integer of 0, 1 or 2, each of n and m independently represents an integer of not less than 3, n is at most 10, m is at most 22, and G is selected from the group consisting of —OCONH—, —COO⁻N⁺H₃—, —CONHCONH—, —OCO—, —CO—, —O—, —NH—, —Si(OH)₂—, —SiCH₃(OH)—, —C$_q$H$_{2q}$Si(OH)₂—, and —C$_q$H$_{2q}$ SiCH₃(OH)—, wherein q is 1, 2 or 3,
wherein said lubricant has fluorinated hydrocarbon oriented in a direction toward a surface and containing hydrogen in one end thereof and hydrocarbon so that the lubricant has a low friction coefficient and a high load resistance, said hydrogen increasing an affinity between said fluorinated hydrocarbon and said hydrocarbon.

2. A medium according to claim 1, wherein said lubricant is coated on said magnetic layer via a protective film for protecting said magnetic layer.

3. A medium according to claim 1, wherein a solution of a compound having a structure:

$$HCF_2C_9F_{18}COO^-N^+H_3C_{17}H_{35}$$

is coated as said lubricant on said magnetic layer.

4. A medium according to claim 1, wherein said support is formed by coating a nickel-phosphorus plating film on an aluminum alloy substrate, and a cobalt-nickel-phosphorus alloy is plated as said magnetic layer on said support.

5. A medium according to claim 3, further comprising NiO coated as a protective film between said magnetic layer and said lubricant.

6. A medium according to claim 3, further comprising diamond-like carbon coated as a protective film between said magnetic layer and said lubricant.

7. A medium according to claim 3, further comprising a carbon film coated as a protective film between said magnetic layer and said lubricant.

8. A medium according to claim 1, wherein a solution of a compound having a structure:

$$H_3CC_{10}F_{20}COO^-N^+H_3C_{22}H_{45}$$

is coated as said lubricant.

9. A medium according to claim 1, wherein a solution of a compound having a structure:

$$H_3CC_{10}F_{20}OCONHC_{22}H_{45}$$

is coated as said lubricant.

10. A medium according to claim 1, wherein a solution of a compound having a structure:

$$H_2CFC_9F_{18}CONHCONHC_{22}H_{45}$$

is coated as said lubricant.

11. A medium according to claim 1, wherein a solution of a compound having a structure:

$$HCF_2C_9F_{18}OCOC_{18}H_{37}$$

is coated as said lubricant.

12. A medium according to claim 1, wherein a solution of a compound having a structure:

$$HCF_2C_9F_{18}COC_{18}H_{37}$$

is coated as said lubricant.

13. A medium according to claim 1, wherein a solution of a compound having a structure:

$$HCF_2C_9F_{18}OC_{18}H_{37}$$

is coated as said lubricant.

14. A medium according to claim 1, wherein a solution of a compound having a structure:

$$HCF_2C_9F_{18}NHC_{18}H_{37}$$

is coated as said lubricant.

15. A medium according to claim 1, wherein a solution of a compound having a structure:

$$HCF_2C_9F_{18}\text{—}C_2H_4Si(OH)_2C_{18}H_{37}$$

is coated as said lubricant.

16. A medium according to claim 1, wherein a solution of a compound having a structure:

$$HCF_2C_9F_{18}\text{—}C_2H_4SiCH_3(OH)C_{18}H_{37}$$

is coated as said lubricant.

17. A medium according to claim 1, wherein a $\gamma\text{-Fe}_2O_3$ thin film is coated as said magnetic layer on said support.

18. A medium according to claim 3, further comprising a silicic acid polymer coated as a protective film between said magnetic layer and said lubricant.

19. A medium according to claim 1, wherein said hydrogen increasing an affinity between said fluorinated hydrocarbon and said hydrocarbon provides a strong cohesive force between said fluorinated hydrocarbon and said hydrocarbon.

* * * * *

UNITED STATES PATENT AND TRADEMARK OFFICE
CERTIFICATE OF CORRECTION

PATENT NO. : 5,521,017
DATED : May 28, 1996
INVENTOR(S) : Masahiro YANAGISAWA, et al.

It is certified that error appears in the above-indentified patent and that said Letters Patent is hereby corrected as shown below:

Column 6, line 45 (equation (3)), delete "$H_2$" and insert --$H_3$--.

Signed and Sealed this

Third Day of September, 1996

Attest:

BRUCE LEHMAN

Attesting Officer　　Commissioner of Patents and Trademarks